No. 1 — POLYVINYL ALCOHOL BARRIER MEMBRANE CONTAINING 5% OF STARCH

No. 2 — POLYVINYL ALCOHOL BARRIER MEMBRANE CONTAINING 15% OF STARCH

No. 3 — POLYVINYL ALCOHOL BARRIER MEMBRANE CONTAINING 30% OF STARCH

J. WATANABE, S. HOSOI, M. KUWAZAKI, A. OTA, T. TAKATA & J. ASAOKA
INVENTORS

BY Stevens, Davis, Miller & Mosher
ATTORNEY

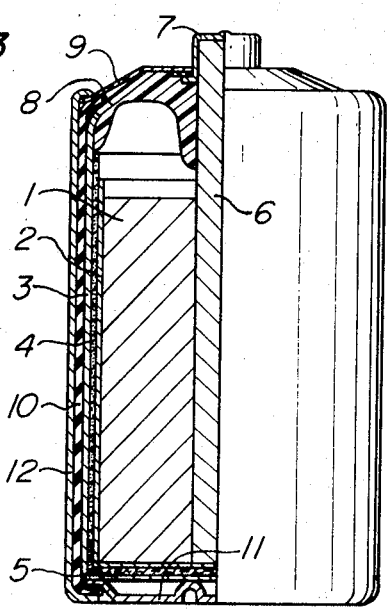
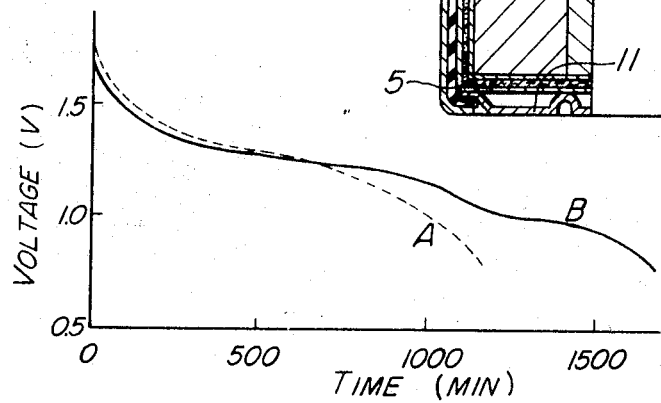
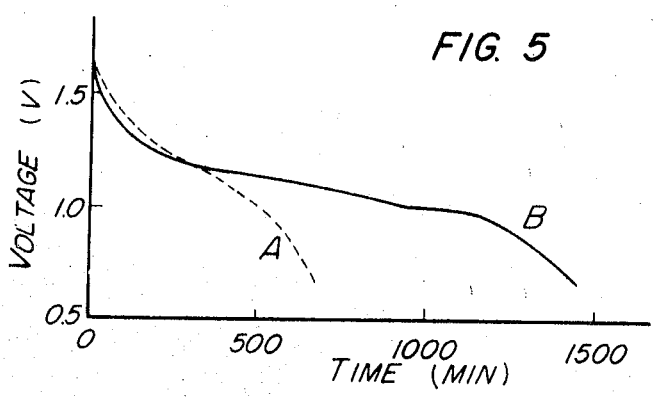

United States Patent Office 3,647,552
Patented Mar. 7, 1972

3,647,552
DRY CELLS
Jun Watanabe, Osaka, Susumu Hosoi, Neyagawa-shi, Masahiro Kuwazaki and Akira Ota, Osaka, and Toshikatsu Takata and Junichi Asaoka, Moriguchi-shi, Japan, assignors to Matsushita Electric Industrial Co., Ltd., Osaka, Japan
Filed July 22, 1969, Ser. No. 843,598
Claims priority, application Japan, July 24, 1968, 43/52,889; July 31, 1968, 43/54,749
Int. Cl. H01m 3/02
U.S. Cl. 136—131                                3 Claims

ABSTRACT OF THE DISCLOSURE

A dry cell of excellence in performances, particularly in discharge characteristics, in which a membrane is interposed between a cathode mixture and a negative electrode constituting zinc casing, and more specifically between the cathode mixture and a paste layer, said membrane being of such a character that it blocks the transfer of water and a paste from the paste layer side to the cathode mixture side without being dissolved during storage and in the earlier stages of discharge of the cell, whereas it is dissolved to prevent a sharp increase of the zinc ion concentration in the vicinity of the paste layer in the latter stage of discharge of the cell when the zinc ion concentration in the electrolyte is increased.

---

The present invention relates to improvements in the separator used in dry cells, and more particularly relates to a dry cell having excellent performance, in which a membrane of the character which is dissolved when the zinc ion concentration in the electrolyte has risen beyond a predetermined value is interposed between a cathode mixture and a zinc casing constituting a negative electrode, and more specifically between a paste layer and the cathode mixture, said membrane acting as a barrier during storage of the cell blocking the transfer of water and the paste to the cathode mixture side, as a barrier in the earlier stage of discharge of the cell similarly blocking the transfer of water and the paste, and being dissolved into a paste-like state in the latter stage of discharge of the cell as the zinc ion concentration in the electrolyte increases incident to dissolution of the negative electrode-constituting electrode resulting from the discharge, thereby to increase the discharge capacity and hence improve the performance of the cell.

A dry cell is composed of a positive electrode depolarizer, a separator containing an electrolyte, and a metal constituting a negative electrode. In this type of dry cell, which is called a Leclanche cell, there was used natural manganese dioxide as the positive electrode depolarizer. However, since natural manganese dioxide has a low percentage of effective oxygen with respect to discharge of the cell and a small discharge capacity, it has been customary to use electrolytic manganese dioxide to improve the discharge performance of the cell, which has a high percentage of effective oxygen. On the other hand, as regards the separator the so-called paste-type separator has been used which consists of a gelatinized starch with an electrolyte contained therein. A Leclanche cell which is presently regarded as a high performance cell is composed of a cathode mixture consisting essentially of electrolytic manganese dioxide, acetylene black, ammonium chloride, zinc chloride and water; a paste-type separator impregnated with an electrolyte consisting essentially of ammonium chloride, zinc chloride and water; and an amalgamated zinc casing constituting a negative electrode. With the development of civilization and the development of electronics in recent years, a demand for an inexpensive manganese dry cell is increasing more and more, and further improvements in the discharge performance of the cell, with all the techniques, are desired.

The industrial demand for cells is versatile and the number of types of dry cells presently available has already exceeded scores. The consumption and demand for manganese dry cells depends upon improvements in the intermittent discharge performance thereof, and the improvement in the intermittent discharge performance is obviously influenced by the amount of manganese dioxide contained in the cathode mixture. Namely, how to increase the amount of manganese dioxide in the limited capacity of the cell, while taking account of the storage property and leakage proof property, is the vital factor to improve the intermittent discharge performance of the cell. With this in view, the use of a paper separator in place of the paste-type separator and a carbon post-insertion method to be described later are being studied. This is a method wherein a separator consisting of a Japanese paper, a filter paper or kraft paper which has a paste of starch, dispersed in an electrolyte, coated and dried on one or both faces thereof is interposed between a cathode and a negative electrode-constituting zinc casing and thereafter a positive electrode-constituting carbon rod is inserted into the center of said cathode mixture, said paste being gelatinized with zinc chloride and water present in the cathode mixture or the electrolyte to be added. However, the paste material in the paste layer thus formed is susceptible to oxidation decomposition and deteriorates the depolarizing capacity of the manganese dioxide, so that it was inevitable for the discharge performance and the shelf life of the cell to be impaired. For this reason, a water-soluble cellulose derivative, i.e. synthetic paste, came to be used in place of the natural paste, but such a synthetic paste is defective in that it is less capable of retaining water and further it moves into the cathode mixture penetrating through the paper, along with the water in the separator, when said water is transferred into the cathode during discharge and storage of the cell. The carbon post-insertion method has the following drawback: namely, when a carbon is inserted into the center of the cathode mixture, a considerably large pressure is exerted over the surface of the lower portion of the paper separator, so that there is the danger of the cathode mixture being forced through the separator and brought into direct contact with the negative electrode-constituting zinc casing. Such an undesirable phenomenon would not be eliminated no matter how large the thickness of the paper layer may be, because the paper layer is made at a suitable fiber density so as to impart to it a sufficient water-absorbing property and water-retaining property and the strength required for fabrication. In view of the above, it was proposed to use an ion-permeable film, e.g. of polyvinyl alcohol, polyvinyl acetate or the like of low saponification degree, as a barrier to block the transfer of the paste material towards the cathode mixture side, and a few kinds of cells, incorporating such a barrier film, have been produced heretofore. However, although the barrier film is required to have sufficient absorbability, retainability and swellability with respect to the electrolyte and not to be dissoluble and dispersible, those which have actually been used do not entirely satisfy such requirements. Therefore, the use of such a barrier film interior of the separator not only adds to the internal resistance of the cell but also results in the occurrence of a counter electromotive force within the cell and the formation of zinc compounds in the vicinity of the negative electrode-constituting zinc casing because the diffusion velocity of zinc ions through the barrier film is so slow that the sharp increase in the zinc ion concentration at the paste layer as a result of the negative electrode-constituting zinc casing being dissolved during discharge of the cell cannot be alleviated. Thus, the discharge performance of the cell is substantially degraded. Such a phenomenon is obviously very detrimental to the continuous discharge performance of the cell, but also not less detrimental to the intermittent discharge performance of the cell. With the prior art barrier films, the aforesaid undesirable condition was further aggravated since they are all unsatisfactory in respect of absorbability, swellability and adhesive property. In addition, they imposed an adverse affect on the discharge performance and the storage property of the cell because they did not always produce a satisfactory bond between them and the cathode mixture or the negative electrode-constituting zinc casing. What is particularly important to note here is that the prior art films are not dissolved but remain in their complete shape between the cathode mixture and the negative electrode-constituting zinc casing, even in the latter stage of discharge of the cell, thus making the above-described drawback more apparent. It is for this reason that only a few kinds of dry cells incorporating such a barrier film are in use at the present time and these dry cells are not entirely satisfactory.

The present invention contemplates the elimination of the aforesaid drawback possessed by the conventional dry cells. Namely, the object of the present invention is to improve the performance of a dry cell, particularly the discharge performance and the storage property of the cell, by interposing, as a barrier, a membrane between a paste layer and a cathode mixture, which membrane has excellent absorbability, retainability, swellability and adhesive property with respect to the electrolyte or consists of one or more kinds of materials excelling in at least one of absorbability, retainability, swellability and adhesive property with respect to the electrolyte and which is dissoluble upon the rising of the zinc ion concentration in the electrolyte.

The present invention will be described in detail hereinafter with reference to the accompanying drawings, in which:

FIG. 3 is a side elevation of a dry cell according to the present invention, with a half side thereof shown in section;

FIG. 4 shows discharge performance curves obtained by the ASA Heavy Industrial Test wherein discharge has been performed on a 4Ω load resistor for 30 minutes a day; and FIG. 5 shows discharge performance curves obtained by the ASA Heavy Industrial Test wherein intermittent discharge has been repeated on a 4Ω load resistor to discharge for 4 minutes and to stop for 11 minutes, the intermittent discharge cycle being continued for 8 hours a day.

A barrier membrane having excellent absorbability, retainability, swellability and adhesive property may be formed, for example, of polyvinyl alcohol, polyethylene glycol or polyethylene oxide, and by changing the saponification degree and polymerization degree of such polymer it is possible to obtain a membrane which is soluble into a pasty state at any electrolyte concentration at a point of discharge capacity when the membrane is desired to be dissolved. For instance, polyvinyl alcohol is insoluble in electrolyte in the range of saponification degree of 0 to 75 but becomes soluble in the range of saponification degree of 75 to 95 when the zinc ion concentration has reached a level exceeding a predetermined value. Polyethylene glycol and polyethylene oxide also become soluble at a polyvinyl alcohol-solubilizing zinc ion concentration, for example, of about 10% as the polymerization degree rises, although this is somewhat variable depending upon the amount of ammonium chloride.

As a material which has at least one of the properties of absorbability, retainability, swellability and adhesive property, colloidal silica, pulp, agar, polyacrylamide, hydroxypropylcellulose; natural pastes, such as starch, wheat flour, corn starch and karaya gum; synthetic pastes, such as methyl cellulose, methyl ethyl cellulose and carboxymethyl cellulose; and inorganic salts, such as ammonium chloride, zinc chloride, potassium chloride, sodium chloride, calcium chloride or lithium chloride, which are used for controlling the solubility of barrier membrane and increasing the ion diffusion velocity through the barrier membrane, are thought of. A barrier membrane which is soluble into paste at any concentration of electrolyte at a point of discharge capacity when said membrane is desired to be dissolved, can easily be obtained by incorporating one or more of these materials in the above-described membrane, in the form of powder or solution in a suitable solvent.

Figure 1:
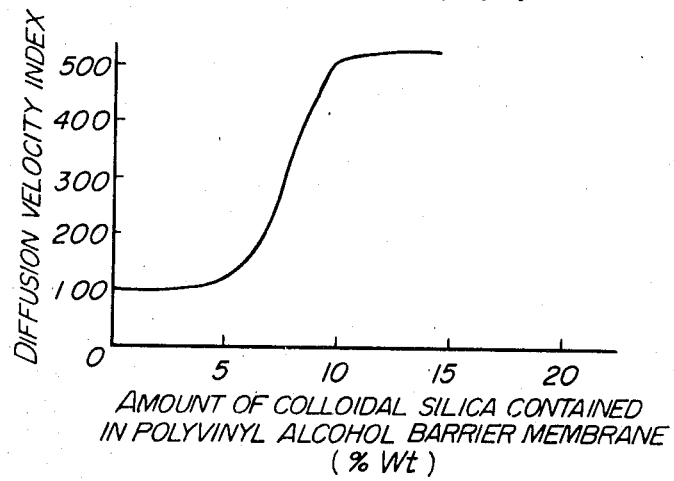
FIG. 1 is a diagram graphically showing the relationship between the amount of colloidal silica contained in a barrier membrane formed of polyvinyl alcohol and the diffusion velocity of zinc ion.
Figure 2:
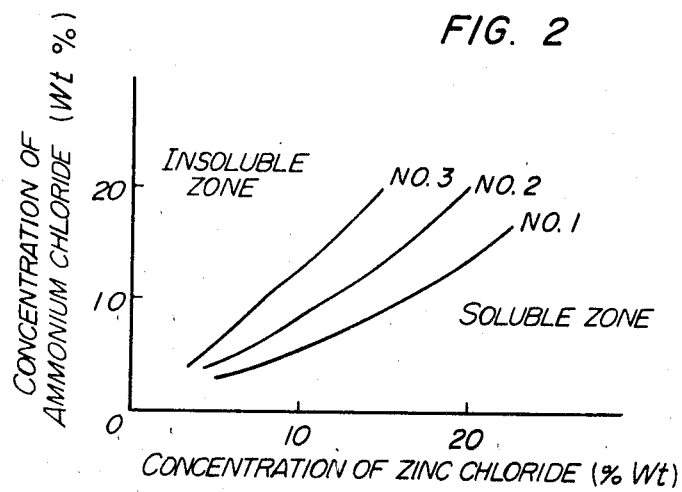
FIG. 2 is a diagram graphically showing the solubility of a starch-containing polyvinyl alcohol barrier membrane relative to an electrolyte composed of ammonium chloride, zinc chloride and water.

The barrier membrane formed in the manner described has excellent absorbability, retainability and swellability. Therefore, when the membrane is disposed within the cell, it contains a large amount of water therein which is hardly movable in said membrane. That is to say that an electrolyte is retained abundantly by the barrier membrane and an internal resistance caused by the membrane is very small and even smaller where the membrane incorporates the aforesaid ingredient or ingredients. In addition, the water present in the vicinity of the ingredient or ingredients serves as a medium for the diffusion of zinc ions through the barrier membrane, so that the diffusion velocity is very high as may be seen in FIG. 1 which shows that the diffusion velocity through a polyvinyl alcohol membrane with 10% of colloidal silica incorporated therein is 5 times or more as high as that through a membrane consisting solely of a polyvinyl alcohol of a low degree of saponification. Thus, a sharp increase in zinc ion concentration at the paste layer, resulting from the dissolution of the negative electrode-constituting zinc casing during discharge of the cell, can be considerably remedied, Further, the most important feature of the barrier membrane according to the present invention is that the barrier membrane is dissolved when the zinc ion concentration has reached a level higher than a predetermined value due to the dissolution of the negative electrode-constituting zinc casing during discharge of the cell, resulting in an increase in zinc ion concentration, in conjunction with the mixing ratio of ammonium chloride, zinc chloride and water of which the electrolyte is composed and is charged into the cell during its production. This is exemplified in FIG. 2 with reference to polyvinyl alcohol membranes incorporating 5%, 15% and 30% of starch respectively. Namely, according to the present invention a barrier membrane which is soluble into paste at the time of a desired level of power consumption during discharge operation can be obtained by varying the mixing ratio of ammonium chloride, zinc chloride and water of which the electrolyte is composed and charged at the time of the production of the cell; the type, the saponification degree and the polymerization degree of a material of which the barrier membrane is formed; and the type and the amount of additive or additives to be incorporated in said membrane, if the type of discharge is known. The barrier membrane according to the invention incorporating a material or materials having excellent absorbability, retainability, swellability and adhesive property with respect to the electrolyte, shows properties equivalent or even superior to those of a paste layer in the conventional paste-type separator, when dissolved into a paste. The barrier membrane thus dissolved enables a further higher ion diffusion velocity to be obtained and thereby gives a highly favorable influence on the discharge performance of the cell. Moreover, the barrier membrane according to the invention produces a good bond between it and the cathode mixture or negative electrode-constituting zinc casing, not only in the state of a paste upon dissolution, but also in its shape and is, therefore, highly suitable for the discharge reaction.

As described above, the barrier membrane of this invention is capable of retaining a large amount of electrolyte therein over an extended period and additionally it is highly effective for preventing the decomposition of the paste and the displacement of the same towards the cathode mixture side which is considered as one of the causes for the sharp voltage drop of a cell during storage and discharge operation. In view of the foregoing, it can be said that the barrier membrane according to this invention is highly valuable for the manufacture of dry cells of the type incorporating a film designed to be dissolved during the discharge operation. Furthermore, the barrier membrane of this invention completely attains its primary objects of this type of membrane, that is, to prevent penetration of the cathode mixture through the separator paper and to prevent the transfer of water and paste material into the cathode mixture.

The barrier membrane according to this invention may be prepared so that when used in a dry cell as a separator layer, it may stand as such, without being dissolved, throughout the period of discharge operation or may be dissolved into paste in the course of the discharge operation or may retain its shape before incorporation into a cell but be gelatinized at the same time when the cell is produced.

A method of producing a dry cell incorporating a barrier membrane according to the invention, which is so prepared as to be dissolved at a voltage of 1.0 v. when the cell is discharged for 30 minutes a day with a load of 4 ohms connected thereto, will be described hereunder with reference to FIG. 3.

80 parts of manganese dioxide, 10 parts of acetylene black, 25 parts of ammonium chloride, 5 parts of zinc chloride and 20 parts of water are blended to a suitable degree and the mixture is molded to form a cathode mixture 1. The cathode mixture 1 thus molded is wrapped by a 40μ thick barrier membrane 2 according to the present invention which is formed of a polyvinyl alcohol having a saponification degree of 85 and polymerization degree of 1500 and containing 10% of colloidal silica and 5% of starch. On the other hand, a paste composed of 50 parts of polyethylene, 35 parts of methyl cellulose, 5 parts of polyacrylamide, 5 parts of pulp and 5 parts of starch is applied to the inner surface of a negative electrode-constituting zinc casing 3 in a molten state at a temperature of 100 to 150° C. to form a paste layer 4, and after placing a sheet of paper 5 at the bottom of the zinc casing 3, an electrolyte composed of 20 parts of ammonium chloride, 8 parts of zinc chloride and 72 parts of water is charged into said zinc casing. Thereafter, the aforesaid anolyte mixture is inserted in the zinc casing 3 and a positive electrode-constituting carbon rod 6 is inserted into the center of said cathode mixture, whereby a bare cell is formed. The separator layer thus formed withstands sufficiently a large pressure imposed on the lower portion thereof, in the practice of the carbon post-insertion method, due to the presence of the flexible barrier membrane according to the present invention, and the paste is sufficiently gelatinized, and thus the effect of the barrier membrane aimed at by the present invention is fully attained. In the light of the foregoing, it may be said that the barrier membrane of this invention is an ideal separator. In FIG. 3, reference numeral 7 designates a positive electrode terminal cap, 8 a sealing member made of a synthetic resin, 9 a metallic closure member, 10 a heat-contractive synthetic resin tube, 11 a negative electrode terminal plate and 12 an outer casing.

With A representing the conventional paste-type dry cell described before and B representing the barrier membrane-incorporating dry cell according to the present invention, the discharge performances, the storage properties and leakage-proof properties of the respective cells are compared with each other on the basis of a UM-1 Type, the results of which are shown in Tables 1, 2 and 3, and the discharge curves of the respective cells are shown in FIGS. 4 and 5. It will be seen from this data that the dry cell incorporating the barrier membrane according to the invention is superior to the conventional cell as regards discharge performance, storage and leakage-proof properties.

TABLE 1
[Comparison of Intermittent Discharge Performance (30 Min./Day) With 4-Ohm Load]

| | Immediately after production | After 6-month storage at 45° C. |
|---|---|---|
| A, min | 1,020 | 840 |
| B, min | 1,400 | 1,320 |

TABLE 2
[Comparison of Storage Property in Terms of Number of Defective Dry Cells in 100 Dry Cells]

| | After 6-month storage at 45° C. | After 12-month storage at 45° C. |
|---|---|---|
| A | 1 | 3 |
| B | 0 | 0 |

TABLE 3
[Comparison of Leakage-Proof Property in Terms of Number of Defective Dry Cells in 50 Dry Cells After 24-Hour Continuous Discharge With 4-Ohm Load]

| | After storage for 30 days | After storage for 60 days |
|---|---|---|
| A | 20 | 50 |
| B | 1 | 3 |

What is claimed is:

1. A dry cell comprising a cathode mixture, a zinc casing constituting a negative electrode and accommodating said cathode mixture, a paste layer formed on the inner surface of said zinc casing confronting said cathode mixture and an ion-permeable barrier membrane interposed between said paste layer and said cathode mixture to block the transfer of water and the paste towards the cathode mixture side and the transfer of the cathode mixture towards the negative electrode-constituting zinc casing, said barrier membrane being of such a character that it retains its shape during storage and in the earlier stages of discharge of the cell but is dissolved in the latter stage of discharge when the zinc ion concentration in the electrolyte has reached a level exceeding a predetermined value, said barrier membrane being formed from polyvinyl alcohol which has a saponification degree of 75 to 95 and a polymerization degree of 1500.

2. A dry cell as defined in claim 1, in which said ion-permeable barrier membrane has colloidal silica contained therein.

3. A dry cell as defined in claim 1, in which said ion-permeable barrier membrane has starch contained therein.

References Cited

UNITED STATES PATENTS

| 2,923,757 | 2/1960 | Klopp | 136—131 X |
| 2,942,057 | 6/1960 | Huber et al. | 136—145 |
| 3,018,316 | 1/1962 | Higgins et al. | 136—144 |
| 3,513,033 | 5/1970 | Watanabe et al. | 136—146 X |

DONALD L. WALTON, Primary Examiner

U.S. Cl. X.R.

136—145, 146